(12) United States Patent
Kalwar

(10) Patent No.: US 9,728,940 B2
(45) Date of Patent: Aug. 8, 2017

(54) METHOD FOR SURFACE TREATING A SUBSTRATE AND DEVICE FOR CARRYING OUT THE METHOD

(75) Inventor: Klaus Kalwar, Steinhagen (DE)

(73) Assignee: KALWAR CIV INNOSERV GMBH & CO. KG, Halle (DE)

( * ) Notice: Subject to any disclaimer, the term of this patent is extended or adjusted under 35 U.S.C. 154(b) by 1018 days.

(21) Appl. No.: 13/511,795

(22) PCT Filed: Nov. 24, 2010

(86) PCT No.: PCT/EP2010/068150
§ 371 (c)(1),
(2), (4) Date: Oct. 9, 2012

(87) PCT Pub. No.: WO2011/064268
PCT Pub. Date: Jun. 3, 2011

(65) Prior Publication Data
US 2013/0034723 A1 Feb. 7, 2013

(30) Foreign Application Priority Data

Nov. 24, 2009 (DE) .......................... 10 2009 044 638
Sep. 2, 2010 (DE) .................... 20 2010 008 435 U

(51) Int. Cl.
*C23C 4/12* (2016.01)
*B32B 5/16* (2006.01)
*H01T 19/00* (2006.01)
*B05C 9/02* (2006.01)
*B29C 59/12* (2006.01)
*B05D 3/14* (2006.01)

(52) U.S. Cl.
CPC ................ *H01T 19/00* (2013.01); *B05C 9/02* (2013.01); *B29C 59/12* (2013.01); *B05D 3/144* (2013.01); *Y02P 20/582* (2015.11); *Y10T 428/25* (2015.01); *Y10T 428/265* (2015.01)

(58) Field of Classification Search
None
See application file for complete search history.

(56) References Cited

U.S. PATENT DOCUMENTS

| | | | |
|---|---|---|---|
| 4,615,906 A | | 10/1986 | Kolbe et al. |
| 4,929,319 A | | 5/1990 | Dinter et al. |
| 4,940,521 A | * | 7/1990 | Dinter et al. .................. 204/164 |
| 5,001,002 A | * | 3/1991 | Gribbin et al. ............... 442/149 |
| 5,013,601 A | * | 5/1991 | Bothe et al. .................. 428/323 |
| 5,024,819 A | * | 6/1991 | Dinter et al. ............ 422/186.06 |
| 5,026,463 A | * | 6/1991 | Dinter et al. ................. 204/164 |

(Continued)

FOREIGN PATENT DOCUMENTS

| | | |
|---|---|---|
| DE | 900 429 | 12/1953 |
| DE | 102005050094 | 4/2007 |

(Continued)

*Primary Examiner* — Dah-Wei D Yuan
*Assistant Examiner* — Jethro M Pence
(74) *Attorney, Agent, or Firm* — Henry M. Feiereisen LLC

(57) ABSTRACT

The invention relates to a method for surface treating a substrate (28) by means of an electrical corona discharge, wherein aerosols (5) are sprayed into discharge area defined by an active gap formed between a corona electrode and the substrate (28) during the discharging, designed such that the aerosols (5) are sprayed substantially opposite the direction of gravity.

7 Claims, 3 Drawing Sheets

(56) References Cited

U.S. PATENT DOCUMENTS

| | | | |
|---|---|---|---|
| 5,029,553 A * | 7/1991 | Cox | 118/674 |
| 5,135,724 A * | 8/1992 | Dinter et al. | 422/186.05 |
| 5,186,974 A * | 2/1993 | Gribbin et al. | 427/536 |
| 5,271,970 A * | 12/1993 | Gribbin et al. | 427/569 |
| 5,439,548 A | 8/1995 | Kalwar | |
| 5,645,919 A * | 7/1997 | Bothe et al. | 428/143 |
| 8,067,090 B2 | 11/2011 | Domnick et al. | |
| 2006/0153980 A1* | 7/2006 | Taiana | 427/180 |
| 2007/0272149 A1 | 11/2007 | Imai et al. | |
| 2008/0187487 A1 | 8/2008 | Larsen et al. | |
| 2009/0283671 A1 | 11/2009 | Oleschuk | |

FOREIGN PATENT DOCUMENTS

| | | |
|---|---|---|
| EP | 0 160 889 A2 | 11/1985 |
| EP | 0 279 371 B1 | 4/1990 |
| JP | S63-093365 | 4/1988 |
| JP | H02-099163 | 4/1990 |
| JP | H02-229562 | 9/1990 |
| JP | H10-321465 | 12/1998 |
| JP | 2003-017217 | 1/2003 |

* cited by examiner

METHOD FOR SURFACE TREATING A SUBSTRATE AND DEVICE FOR CARRYING OUT THE METHOD

CROSS-REFERENCES TO RELATED APPLICATIONS

This application is the U.S. National Stage of International Application No. PCT/EP2010/068150, filed Nov. 24, 2010, which designated the United States and has been published as International Publication No. WO 2011/064268 and which claims the priorities of German Patent Applications, Serial No. 10 2009 044 638.9, filed Nov. 24, 2009, and Serial No. 10 2010 008 435.0, filed Sep. 2, 2010, pursuant to 35 U.S.C. 119(a)-(d).

BACKGROUND OF THE INVENTION

The invention relates to a method for surface treating a substrate and a device for carrying out the method.

It is known from EP 0 279 371 B1 to apply an aerosol to the surface of a plastic material to attain an improved and more uniform adhesion for a subsequent coating or, with suitable modification of the aerosols, to directly coat the surface of the plastic material.

In the first case, for example water can be atomized to form aerosols, whereas in the second case, i.e. with direct coating of the plastic surface, suitable solutions are used.

For producing the corona discharge, two spaced-apart electrodes are required, wherein a high voltage is applied to at least one of the electrodes, while the other electrode is connected to ground. The aerosols are sprayed into the discharge region, which is defined by an effective gap formed between a corona electrode and the substrate and having a width of about ≤2 mm. The corona treatment itself is known in the art, for example from the aforementioned EP 0 279 371 B1, so that expressively reference is made thereto.

Due to their structure, the atomizers used for producing the aerosols are not capable to produce aerosols having a uniform size, i.e. aerosols of different size are produced. It has been observed that this diminishes the surface treatment of the substrate, both with respect to producing adhesion forces, by forming adhesion nests of different strength, as well as with respect to applying a coating, when the aerosols are provided for coating the surface of the substrate directly.

It should be noted in this context that the aerosols are atomized from above, in the direction of the force of gravity, to the substrate below, as well as the corona discharge itself, by a corresponding arrangement of the spray nozzles associated with the atomizer or the electrodes.

A method for surface treatment of a substrate with an electric corona discharge is discussed in EP 0 160 889 A2 related to a different technical field, wherein a fluid operates as the corona electrode, wherein the fluid exits from an electrode profile under pressure and advantageously has a good electrical conductivity, wherein the electrode profile is arranged at the bottom with respect to a support electrode.

In contrast to a method in the same technical field, where an effective gap is formed between the corona electrode and the substrate, the conventional type of fluid electrode has no gap to the substrate, i.e. this electrode contacts the substrate directly.

To obtain a corona discharge, a continuous supply of fluid is required which should also have good electrical conductivity. I.e., a permanent fluid wall must be placed between the electrode profile from which the fluid exits and the substrate, so as to cause the corona discharge.

However, this method known from the published literature is not practical for several reasons. For example, parts of the device are permanently connected to an electric potential, which is not acceptable with respect to the occupational safety. Although it is recommended to produce the support electrode from an electrically insulating material and to electrically insulate the supply line for the fluid from a reservoir, this reservoir however must be filled, which is life-threatening during continuous operation of the facility. In this case, it is recommended to interrupt the production flow and to switch the entire device off, which makes operating the device and carrying out this method uneconomical.

It should also be considered in this context that fluid adhering to the substrate cannot be dried off in the desired time. Moreover, the applied fluid does not completely adhere on the substrate, thus requiring suitable capture measures for the draining fluid. Nevertheless, contamination of components by the draining fluid cannot be prevented, thus requiring frequent cleaning and possibly damaging these components.

SUMMARY OF THE INVENTION

It is the object of the invention to improve a method of the generic type and a device for carrying out the method such that the quality of the coating and/or adhesion of the surface of the substrate are significantly improved.

According to one aspect of the invention, this object is solved by a method for surface treatment of a substrate with an electric corona discharge, wherein aerosols are sprayed into the discharge region defined by an effective gap formed between a corona electrode and the substrate during the discharge, wherein the aerosols are sprayed substantially against the direction of gravity.

According to another aspect of the invention, this object is solved by a device having at least two corona electrodes, of which one is connected to a voltage and the other to ground, and one of the corona electrodes forms a support electrode with a support surface for the substrate and the other corona electrode forms a counter electrode, wherein an atomizer is provided which can be used to spray the aerosols into the discharge region of the corona electrodes, wherein the downward oriented surface of the support electrode forms the support surface.

Surprisingly, it has been observed that the surface treatment of the substrate can be significantly improved by spraying the aerosols into the discharge region from below opposite to the direction of gravity; the improvement is particularly evident in a visually noticeable more uniform coating.

The larger aerosols may not be transported up to the surface, so that only aerosols with insignificant differences in size adhere and/or are effective. In any event, a significant improvement in the results is observed, both in the generation of the adhesion forces as well as in the generation of a coating, whereby coating components are sprayed onto the surface of the substrate in form of solutions.

With the generation of adhesion forces, the adhesion of the surface becomes uniform, which allows subsequent processing, for example a coating with a throughout uniform quality.

This is accompanied by a reduction of rejects and hence significantly reduced costs, which is significant because the treated substrates are typically produced in large numbers or large quantities as mass products.

The novel method can also be realized essentially without additional costs and can be carried out compared to the state-of-the-art with a device that can be adapted without incurring additional costs. I.e., the novel method is quasi cost-neutral.

Moreover, the method can be used with all suitable substrates, i.e. with plastics, metals, wood or wood materials and the like, also with webs or bodies having stable dimensions, such as plates, profiles and the like.

As already mentioned, various types of fluids can be used as aerosols, both relating to the fluid itself and to the nature of the aerosols.

The device for carrying out the method includes at least two corona electrodes, with one of the electrodes being connected to a voltage and the other to ground, whereby one corona electrode forms a support electrode with a support surface in contact with the substrate. Aerosols are sprayed with an atomizer into the discharge region of the corona electrodes formed by an effective gap, thereby subjecting the exposed substrate surface facing away from the support electrode to the corona treatment.

According to the invention, the downward oriented surface of the support electrode forms the support surface, so that the aerosols are sprayed with the atomizer essentially from below upward into the discharge region, essentially against the direction of gravity.

Whereas in the state-of-the-art pertaining to the same technical field the discharge region is formed above an imaginary horizontal plane extending through the support electrode, this discharge region according to the novel is located below this horizontal plane.

The novel device can basically be implemented by merely arranging the other corona electrode, which associated with and spaced apart from the support electrode, as a counter electrode through a rotation by 180°. This eliminates complex structural changes, so that the novel device can be produced essentially at no extra cost.

The device is preferably housed at least in the region where the aerosols are present in form of a mist and do not adhere to the substrate, allowing the components of the aerosols to be reused. In addition to economic advantages due to the fact that the aerosols contain additives which are after recovery once more transported to the treatment process, the aerosols do not enter the environment due to the encapsulation of the device, thereby effectively preventing a possible risk for personnel by inhaling aerosols containing, for example, nanoparticles as an additive.

Additional advantageous embodiments of the invention are recited in the dependent claims.

BRIEF DESCRIPTION OF THE DRAWING

The method according to the invention and the device for carrying out the method will again be described in the following with reference to the appended drawings.

It is shown in:

FIGS. 1 and 2 show a device for surface treatment of a substrate 4 which in the illustrated example is formed as a plastic foil to be coated.

DETAILED DESCRIPTION OF PREFERRED EMBODIMENTS

Figure 1:
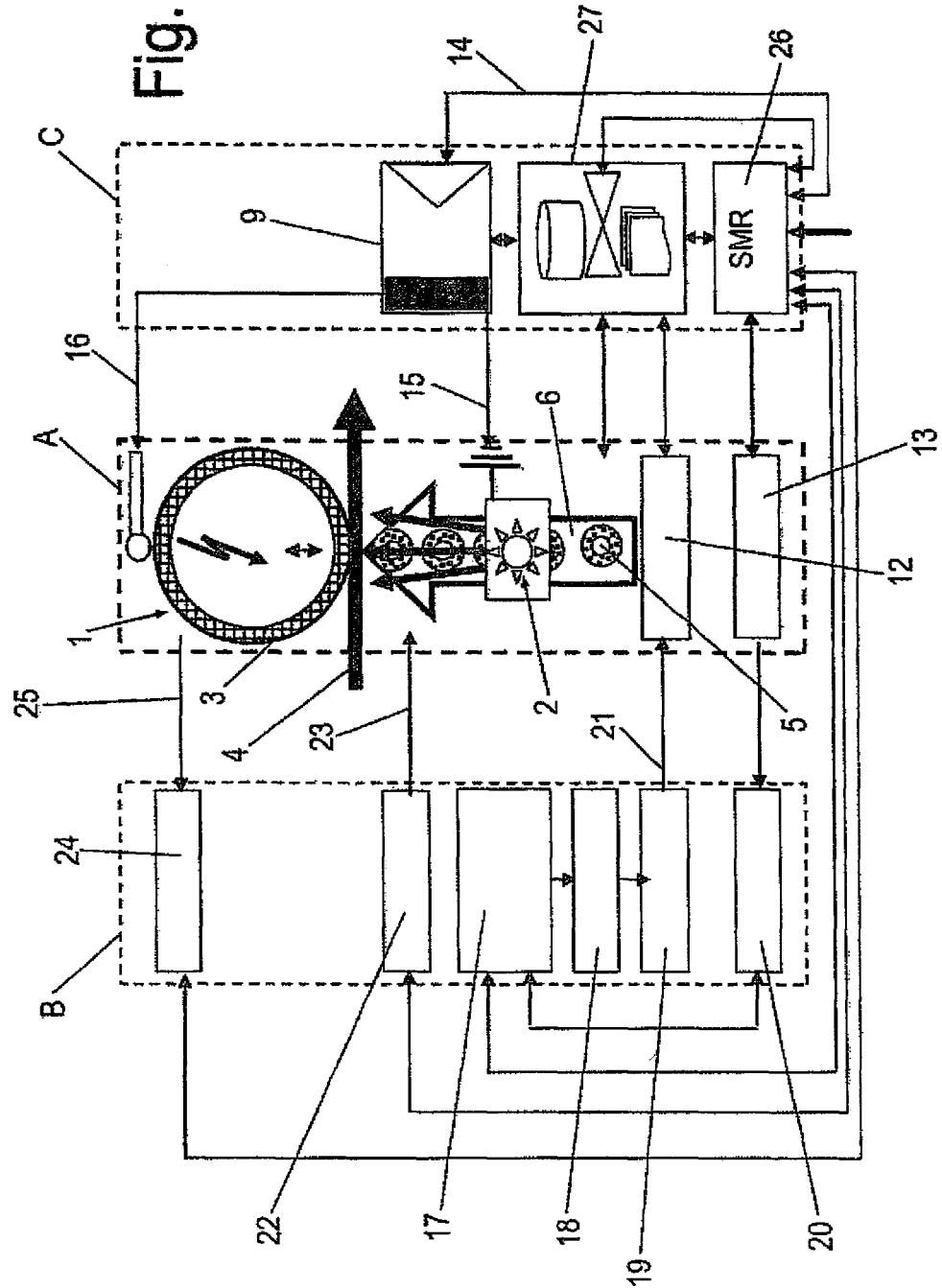
FIG. 1 a device for carrying out the method in a schematic side view.

The device illustrated in FIG. 1 is for simplification divided into three sections A, B, C, wherein the sections B and C each show a schematic circuit diagram, for illustrating the method.

Figure 2:
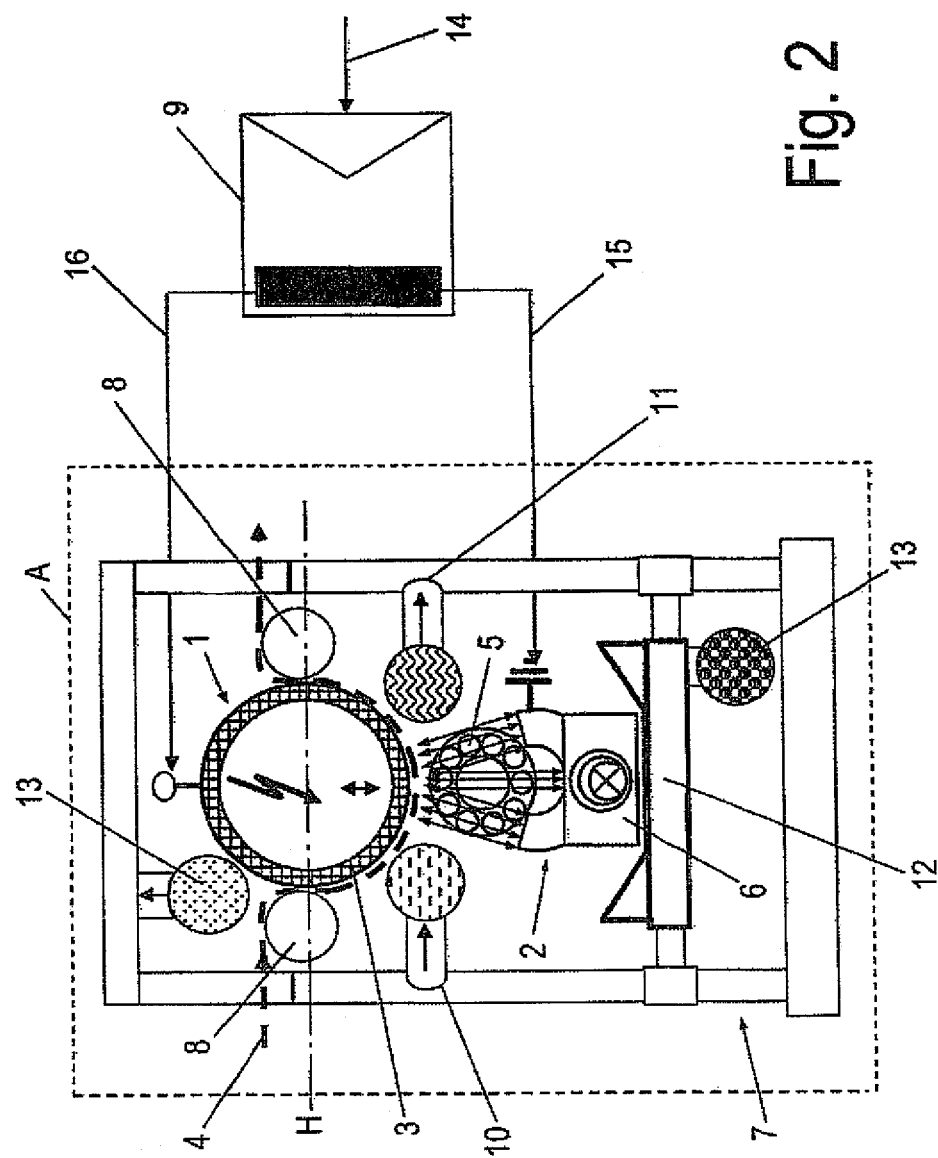
FIG. 2 a part of the device, also in a schematic side view.

The section A is shown again as detail in FIG. 2.

The surface treatment is carried out with an electric corona discharge, with two corona electrodes being provided, wherein one corona electrode is connected as a support electrode 1 via a line 16 to a generator 9, which produces a high voltage and is connected to a power line 14, and the other corona electrode is connected via a ground line 15 as a counter electrode 2 to ground. It will be understood that alternatively the counter electrode 2 may be connected to the voltage and the support electrode 1 to ground.

The counter electrode 2 is arranged below the support electrode 1 in relation to a horizontal plane H extending through the support electrode 1, with the substrate 4 contacting a support surface 3 formed on the support electrode 1.

Aerosols 5 are sprayed with an atomizer 6 into the discharge region indicated by the arrows and located between the counter electrode 2 and the support electrode 1, wherein the nozzles of the atomizer 6 are arranged in the region of the counter electrode 2, so that the aerosols are introduced essentially against the direction of gravity.

Adhesion forces are produced by the corona discharge on the free surface of the substrate 4, as a result of which the substrate surface is then uniformly coated, for example, when the aerosols contain additives.

If the aerosols are only composed of water, an extraordinarily uniform adhesion of the free surface of the substrate 4 is attained with the invention, for a subsequent coating, for example application of a varnish, an imprint or the like.

Furthermore, the support electrode 1 constructed as a cylinder, the counter electrode 2 and the atomizer 6 are arranged in a frame 7, as are support rollers 8 across which the substrate 4 is transported, which extend on both sides of and axis-parallel to the support electrode 1.

In addition, a supply air line 10 and an exhaust air line 11 are installed in the discharge region for providing a safe processing environment.

The atomizer 6 and the counter electrode 2 are held as an assembly in a support 12 constructed as a collection container, in which the excess aerosols and/or particles are collected and returned to the closed-loop material flow via a connection 13.

The counter electrode 2 is preferably made of at least one, preferably stranded, wire which can be adjusted by way of guidance and adjusting means in relation to the width of the substrate passing through.

The counter electrode 2 requires cleaning during operation for maintaining the quality of the corona discharge and/or the coating with the aerosols enriched with additives. For this purpose, the counter electrode 2 is moved through a cleaning device, in particular in an oscillating motion, during the corona discharge. However, such measure is possible only when the counter electrode 2 is connected to ground and thus safe to touch.

While the section A illustrates the material treatment, the supply means are schematically illustrated in section B, and the process functions in section C.

A supply reservoir 17, in which the materials to be processed for aerosol coating are stored and treated, is associated with the section B. After the materials to be recycled have been filtered and cleaned and a throughput measurement 20 is performed, they are supplied to the supply reservoir 17 via the connection 13.

The coating material is transported continuously from the supply reservoir 17 into the atomizer 6 via a measurement device 18 for aerosol formation through multi-component atomization 19 via a line 21 and the support 12.

Air is supplied with a fan 22 via an air supply 23 to the supply line 10, whereas an exhaust duct 25 connected to the exhaust air line 11 supplies drawn-in air to an exhaust fan 24.

Lastly, in section C, a control center 26 and data acquisition 27 with processing and output for the entire system process are associated as functional process components, wherein the functional components relating to the process function C are in operative connection with the corresponding components of the entire system.

Figure 3:
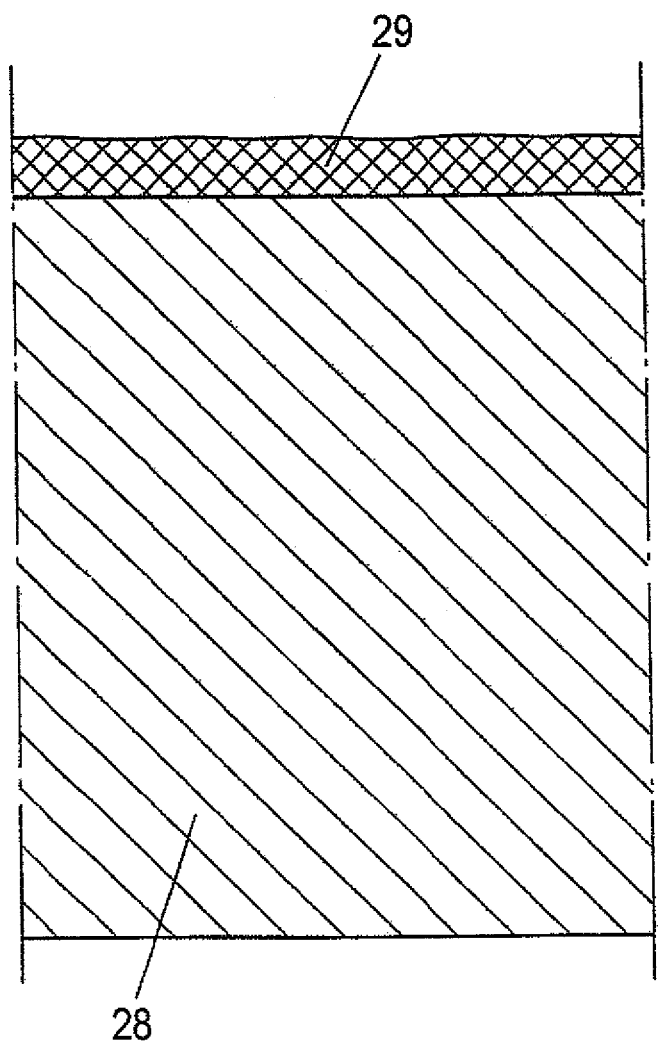
FIG. 3 a partial detail of a substrate produced with the method in a cross-sectional side view.

FIG. 3 illustrates a substrate 28, to which a coating 29 was applied with the method of the invention, in a significantly enlarged cross-section which is not to scale; the substrate is provided in form of a foil, preferably made of plastic, which has a coating 29 applied on one side with a thickness of ≤200 nm, preferably ≤150 nm.

As can be seen, the coating 29 has a mostly uniform layer thickness, wherein only the surface has a small roughness which, however, is insignificant for the intended applications.

In principle, a coating 29 may also be applied to the opposite side of the substrate 28.

Producing the coating 29 with the novel method results in a coating having a very uniform layer thickness, wherein the additives may have prepared particles with a diameter of 0.1 nm-1 mm.

Hardening and/or drying can be performed in different ways, depending on the properties of the applied coating 29. For example, possibilities are heat/air treatment or radiation hardening with electron beam hardening (ESH), UV light, infrared light or with a plasma corona treatment, either in individual treatments or in combinations, which produce cross-linking reactions.

Because of the layer thickness of preferably ≤150 nm, a very small quantity of material may be used for the coating, while simultaneously producing optimized properties due to the uniform layer thickness.

Surprisingly, it has been observed that the quantity of material for the additives may be reduced significantly, which has proven to be particularly advantageous because additives are relatively expensive basic materials.

In addition, the throughput speed of the device with which the coating 29 is applied can be increased, so that the production quantity can be increased significantly.

Moreover, the substantially uniform layer thickness improves the properties of the coating 29 for particular applications. The quality of the coating 29 can also be monitored which was not possible to date to this extent.

In principle, several layers can be applied, with each layer having a thickness according to the invention.

What is claimed is:

1. A device for surface treatment of a substrate with an electric corona discharge, said device comprising:
    at least two corona electrodes, one of the corona electrodes being connected to a voltage and the other one of the corona electrodes being connected to ground, with one of the corona electrodes forming a support electrode having a downwardly oriented surface to form a support surface for a substrate, and with the other one of the corona electrodes forming a counter electrode; and
    an atomizer configured to spray aerosols only upwards in a direction opposite to direction of gravity toward the downwardly oriented surface into a discharge region of the corona electrodes, wherein the atomizer and the downwardly oriented surface are positioned juxtaposed with respect to each other.

2. The device of claim 1, wherein the atomizer is arranged in a region of the counter electrode (2).

3. The device of claim 1, wherein the support electrode is constructed as a cylindrical electrode.

4. The device of claim 1, further comprising support rollers arranged on both sides of the support electrode in axis-parallel relationship to the support electrode.

5. The device of claim 1, wherein the support electrode is connected to the voltage and the counter electrode is connected to the ground.

6. The device of claim 1, wherein the counter electrode is constructed as a stranded wire electrode.

7. The device of claim 1, further comprising a cleaning device for cleaning the counter electrode.

* * * * *